United States Patent [19]
Asano

[11] 3,898,680
[45] Aug. 5, 1975

[54] CASSETTE FOR FILM

[75] Inventor: Yoshio Asano, Miyanishi, Japan

[73] Assignee: Fuji Photo Film Co., Ltd., Minami-Ashigara, Japan

[22] Filed: Nov. 21, 1973

[21] Appl. No.: 417,835

[30] Foreign Application Priority Data
Nov. 21, 1972 Japan............................ 47-116812

[52] U.S. Cl................................. 354/174; 354/275
[51] Int. Cl. .......................................... G03b 19/10
[58] Field of Search ..................... 95/19, 22, 23, 30; 354/160, 174, 178, 275, 276, 277

[56] References Cited
UNITED STATES PATENTS

| | | | |
|---|---|---|---|
| 1,291,004 | 1/1919 | Hutchings | 354/275 X |
| 2,497,157 | 2/1950 | DeWitt | 95/19 |
| 3,643,571 | 2/1972 | Erlichman et al. | 95/19 |

FOREIGN PATENTS OR APPLICATIONS

| | | | |
|---|---|---|---|
| 250,811 | 9/1912 | Germany | 95/22 |
| 139,660 | 4/1903 | Germany | 95/22 |

*Primary Examiner*—Fred L. Braun
*Attorney, Agent, or Firm*—Sughrue, Rothwell, Mion, Zinn & Macpeak

[57] ABSTRACT

A cassette for film having a forward portion formed so as to fit a foremost film sheet into a corresponding inset portion of an autoprocess camera for exposure to light directed through a camera lens, holding guide bands for retention of film-sheets, a light-proof collapsible cover to protect film-sheets from exposure to light other than that directed through the camera lens, when the cassette is mounted on a camera, and elastic elements urging film-sheets to the front portion of the cassette, whereby as each film-sheet is exposed and removed, the succeeding film-sheet is automatically brought to the foremost position in readiness for the next shot.

3 Claims, 23 Drawing Figures

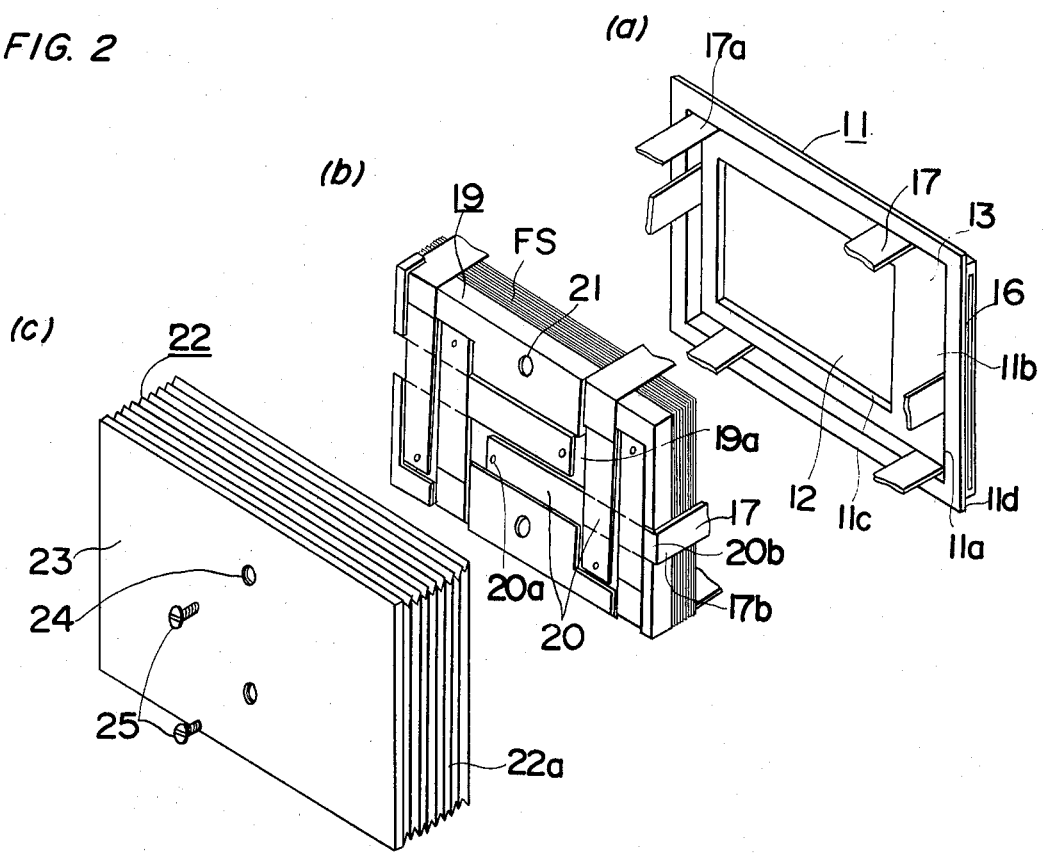
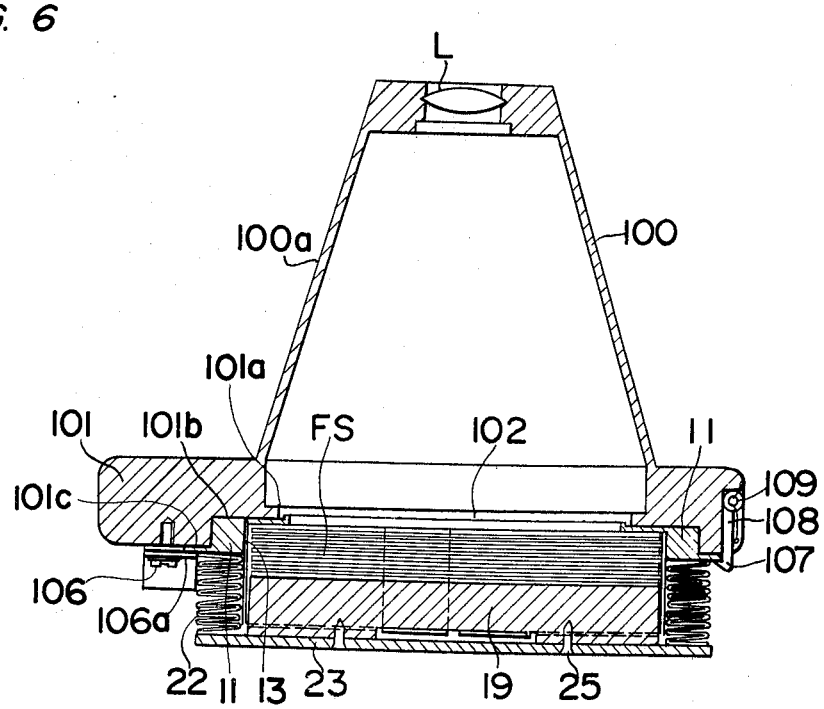

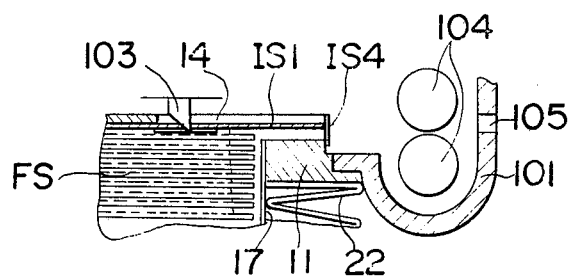
FIG. 7
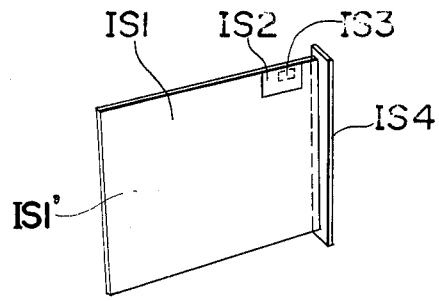
FIG. 8
FIG. 9
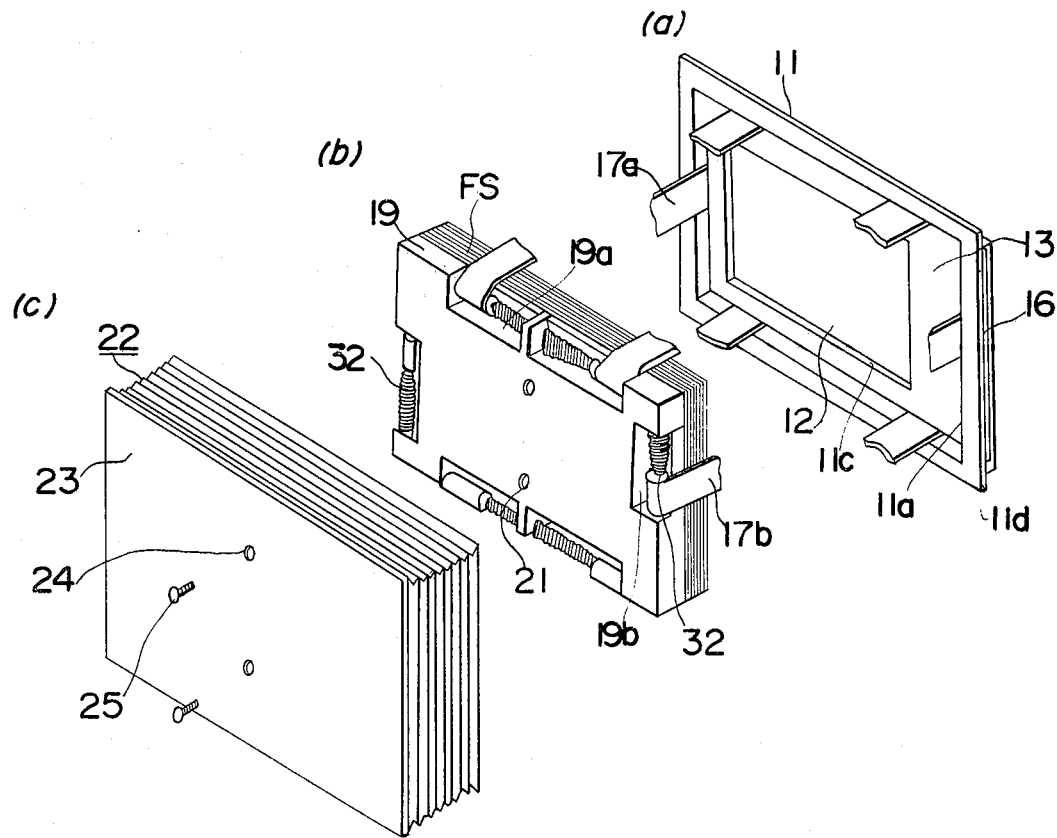

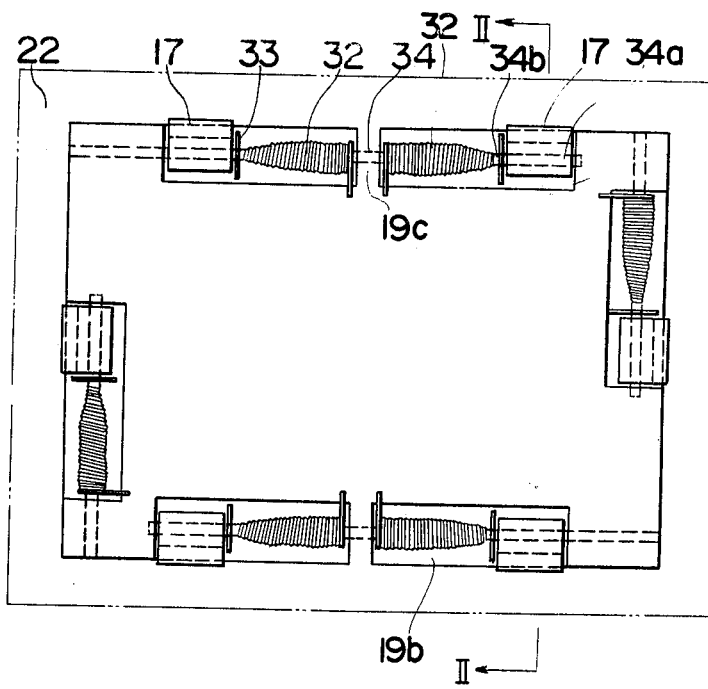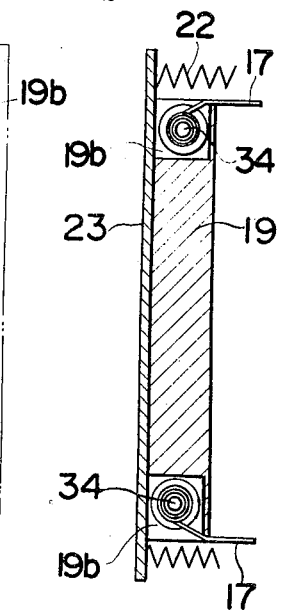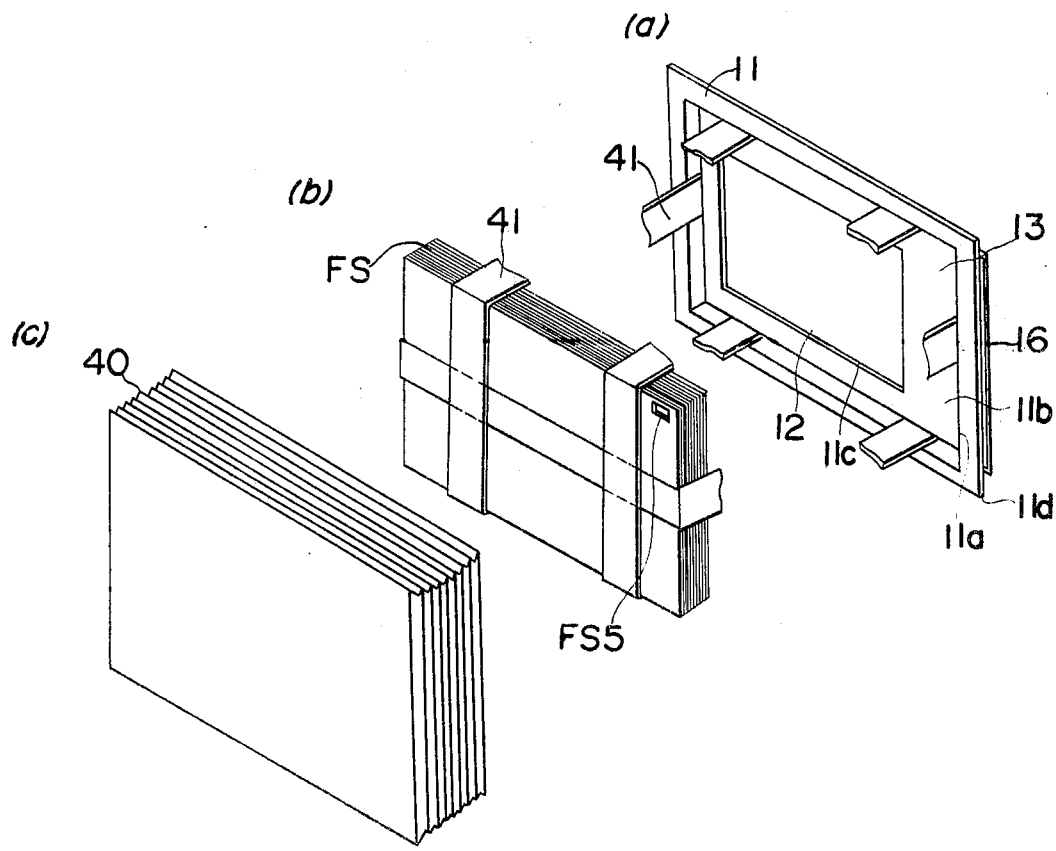

CASSETTE FOR FILM

The present invention relates to a cassette for holding and supplying film in sheet form, and more particularly to a cassette for film which may be freely mounted onto, or detached from a camera, and which permits loading of a large number of film sheets at one time.

There has recently been developed a type of film, which is a combination of a negative film and a positive film, and comprises a container holding a processing and developing solution, and permits production of a positive image of an object photographed almost immediately after exposure of the negative film to light reflected from the object. Such films go under a variety of popular or trade names such as auto-process film, instant process film, monosheet, or film-sheet. Similarly, cameras in which such films are used may be termed auto-process cameras, instant-print cameras, or similar appellations. For the purposes of the present description, this type of film will be referred to as a film-sheet, and a camera associated therewith as an auto-process camera.

Film-sheets are normally contained in cassettes, which are either mounted on an auto-process camera, or from which film-sheets are loaded into a camera. Various types of cassettes are known conventionally, and generally comprise a metal, or metal foil case providing a rigid protective cover for film-sheets, as, for example, the so-called throw-away cassettes. Conventional cassettes have several inherent disadvantages, one of the principal of which is the weight of the cassettes themselves, and of the associated auto-process camera. Conventional cassettes require that an anto-process camera used in association therewith have a protective cover and accommodation portion for insertion, or retention of cassettes, with the result that the camera becomes large, heavy and comparatively difficult to handle, and it is difficult for a photographer using such a camera to exercise his or her photographic skill to the full. Also, even though cassettes may be simply discarded after use, they must be carried prior to use, and this can be a problem when it is desired to have a large number of cassettes ready for immediate loading.

Another principal disadvantage associated with conventional film-sheet cassettes is that the larger the number of film-sheets it is wished to load into a camera, the larger the camera must be. Because increased camera size leads to increased difficulty of manipulation, and increased cost thereof, the maximum number of film-sheets that may be contained in an auto-process camera at one time has hitherto been no more than about ten. But it not infrequently occurs that a photographer wishes to take a large number of shots, for example, 20-30, in quick succession without having to reload, and with conventional film-sheet cassettes this is impossible.

It is accordingly an object of the present invention to provide an improved, light-weight film-sheet cassette.

It is another object of the invention to provide a film-sheet cassette that is used in association with an auto-process camera that is much lighter and simpler in construction than conventional auto-process cameras.

It is a further object of the invention to provide a film-sheet cassette whereby a camera may be loaded with a large number of film-sheets at one time.

It is yet another object of the invention to provide a film-sheet cassette which requires no modification of the construction of an associated auto-process camera, whatever the number of film-sheets loaded at one time.

In accomplishing these and other objects, there is provided, according to the present invention, a film-sheet cassette having a forward portion, which is externally formed so as to fit exactly into a corresponding inset positioning frame portion of an associated auto-process camera, which forms, internally, a holding portion for holding a foremost film-sheet in a correct position for exposure to light directed through a camera lens, and which also possesses a slit to permit removal of an exposed film-sheet from said holding portion. The cassette also comprises holding guide bands for retention of film-sheets, a light-proof collapsible cover to protect film-sheets from exposure to light other than that directed through the camera lens, when the cassette is mounted on a camera, and an elastic means urging film-sheets to the front portion of the cassette, whereby as each film-sheet is exposed and removed, the succeeding film-sheet is automatically brought to the foremost position in readiness for the next shot. During non-use of the cassette, that is, prior to mounting thereof onto a camera, film-sheets contained therein are further protected from exposure to light by a thin, easily removal protective sheet, which is removed after the cassette is mounted on a camera. These and other objects and features of the present invention will bacome apparent from the following description taken by way of example with reference to the accompanying drawings, in which:

FIG. 1 is a perspective view of a cassette for film according to one preferred embodiment of the present invention, FIG. 2, (a) to (c), is an exploded perspective view of the cassette of FIG. 1, FIG. 3 (a) and (b) are perspective views showing the front side and rear side of a film-sheet as inserted in the cassette of FIG. 1, respectively, FIG. 4 is a cross-sectional view of the cassette of FIG. 1 mounted on a camera, FIG. 5 (a) is a rear elevational view of the camera showing cassette fixture portions, FIG. 5 (b) is a perspective view of a portion of FIG. 5 (a) showing the clips, and FIG. 5 (c) is a perspective view of a portion of FIG. 5 (a) showing the clamps.

FIG. 6 is a cross-sectional view taken along the line I—I of FIG. 4,

FIG. 7 is a cross-sectional view, on an enlarged scale, of a portion of FIG. 4,

Figure 1:
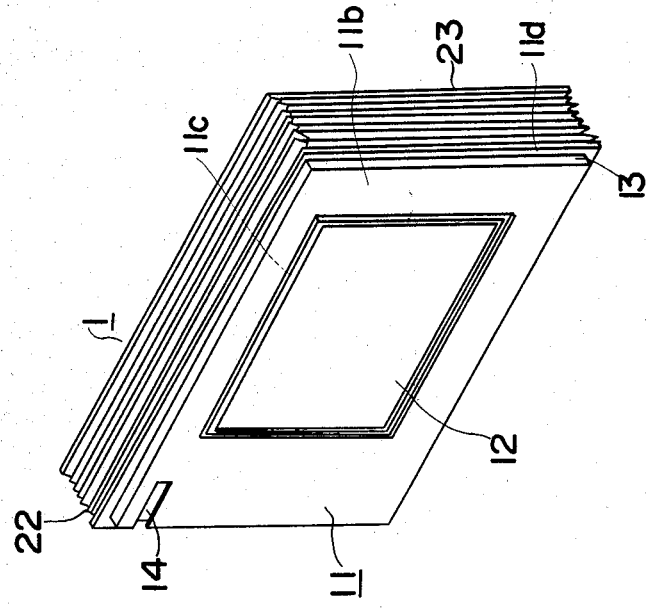
Figure 12:
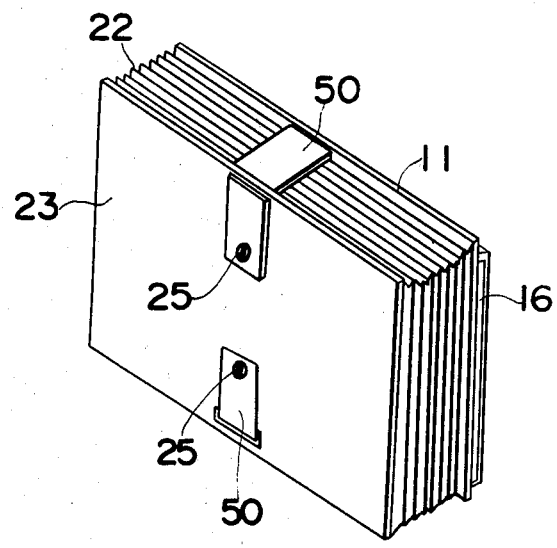
Figure 13:
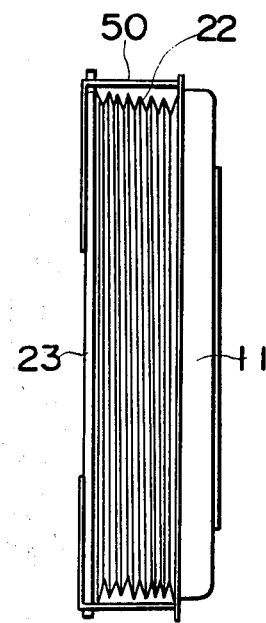
Figure 14:
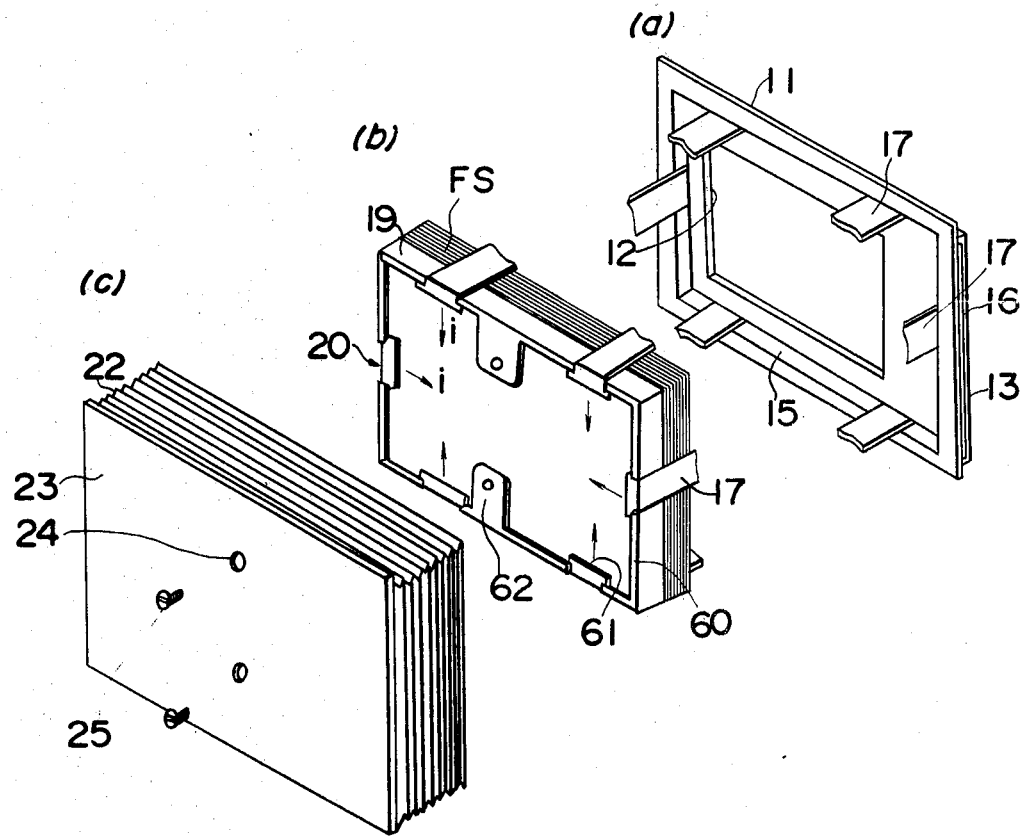
Figure 15:
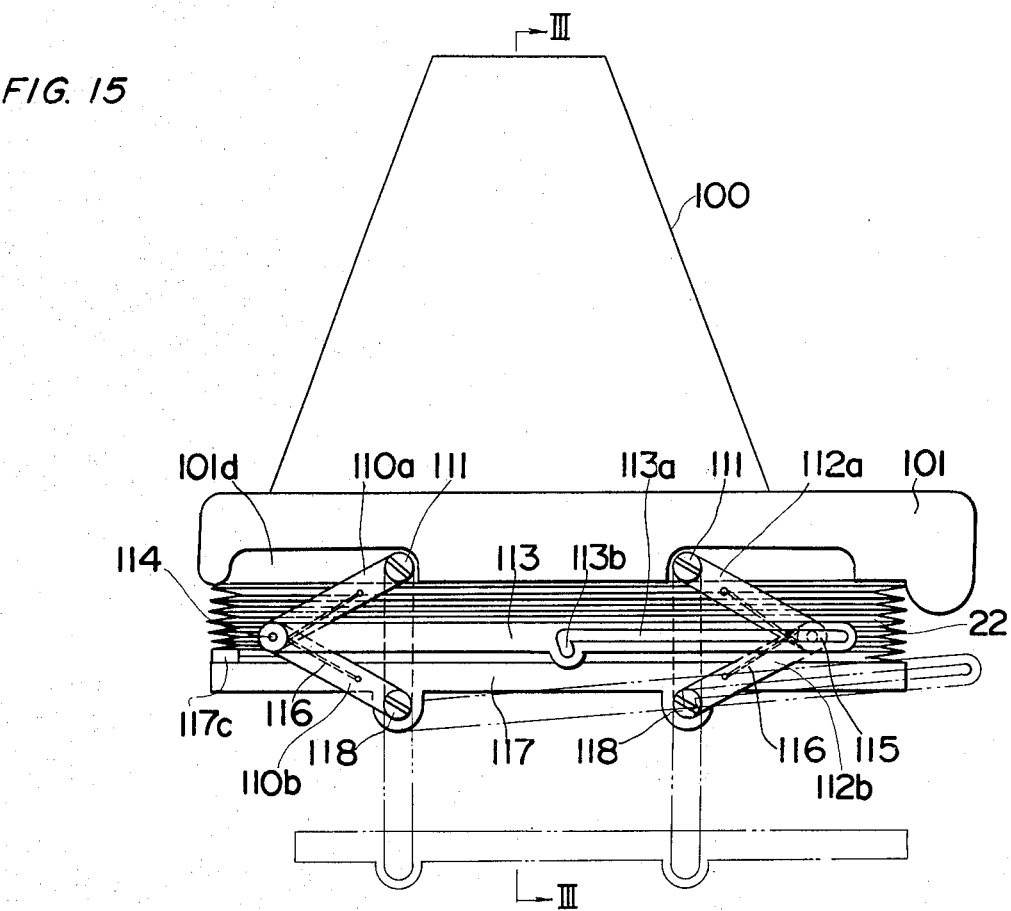
Figure 16:
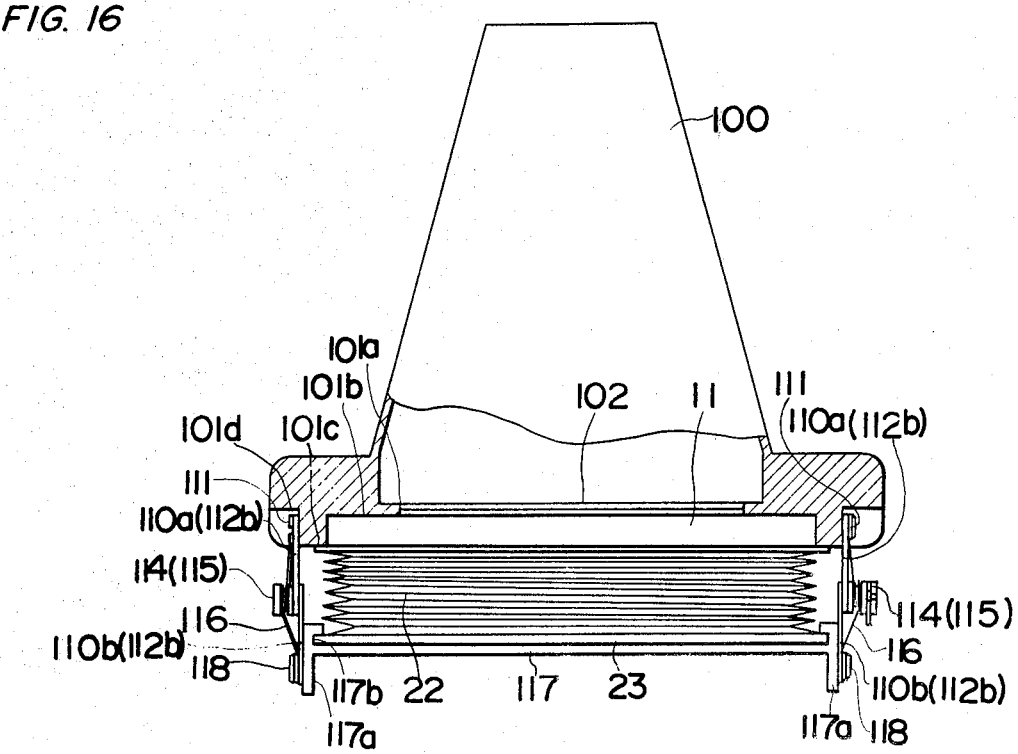

FIG. 8 is a perspective view of a light-proof protective sheet employed in the cassette of FIG. 1, FIG. 9, (a) to (c), is a exploded perspective view of a cassette for film according to a second embodiment of the present invention, FIG. 10 (a) is a rear elevational view of a backboard employed in the cassette of FIG. 9, and FIG. 10 (b) is a cross-sectional view taken along the line II—II of FIG. 10 (a), FIG. 11, (a) to (c), is a exploded perspective view of a cassette for film according to a third embodiment of the present invention, FIG. 12 is a perspective view of a cassette for film according to a fourth embodiment of the present invention, FIG. 13 is a side-elevational view of the cassette of FIG. 12, FIG. 14, (a) to (c), is a exploded perspective view of a cassette for film according to fifth embodiment of the present invention, FIG. 15 is a plan view of the cassette of FIG. 14 mounted on a camera, and FIG. 16 is a cross-sectional view taken along the line III—III of FIG. 15.

Before proceeding with the description, it is to be noted that throughout the attached drawings like numbers refer to like parts. Also, for the purposes of the description, terms indicating location or motion, such as upper, lower, forwards, rearwards, left, or right, are to be taken as being in reference to a normally upright camera, on which a cassette is mounted or as seen by a person aiming the camera at an object.

In FIGS. 1, 2, there is shown a film-sheet casette 1, in accordance with a first embodiment of the present invention, which comprises a front frame 11, a backboard 19, and a bellows-type cover 22.

Figure 4:
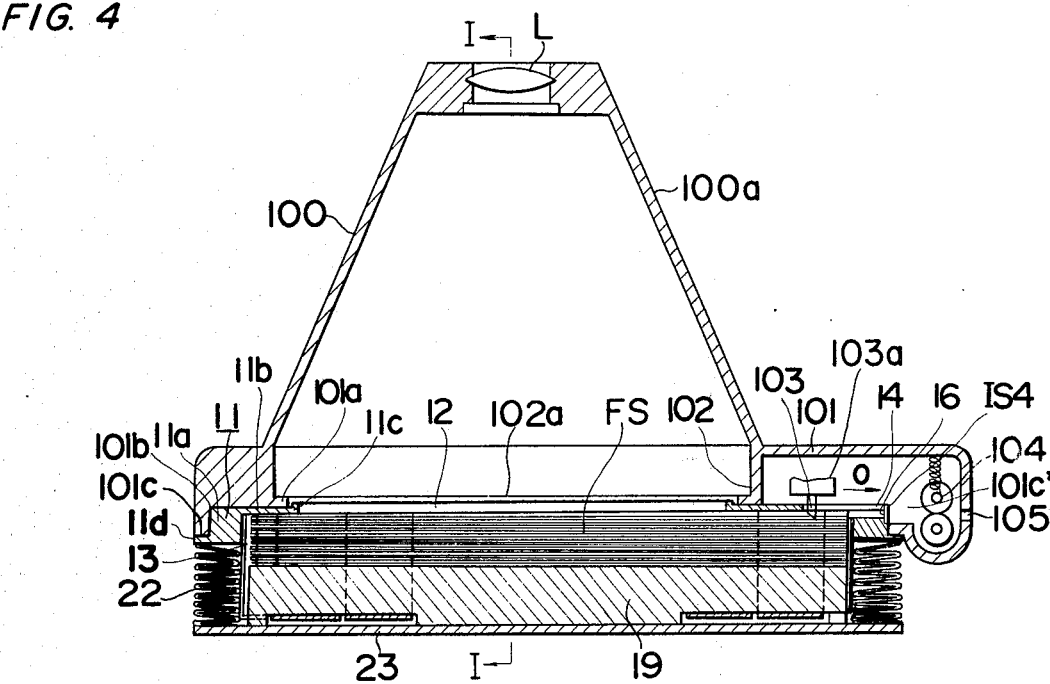

Referring more particularly to FIG. 1, and FIG. 2 (a), the front frame 11 is an integral unit comprising a main body 11a, a front portion 11b, a front rim 11c, and a rear rim 11d. The front rim 11c stands forward with respect to the main body 11a by the front portion 11b, which is a rectangular portion having dimensions smaller than the main body 11a. The cassette 1 contains one or more film-sheets FS therein, and is mounted onto a camera 100 by being inserted into the rear portion thereof, as described in further detail below. Upon insertion of the cassette 1 into a camera 100, the front rim 11c of the frame 11 fits exactly into a correspondingly shaped exposure positioning frame 101a in the camera 100, as shown in FIG. 4. The rear rims 11d form peripheral extensions generally level with the rear surface of the main body 11a. When the cassette 1 is inserted in the camera 100, the rear rims 11d are engaged by clamps 106 and clips 107, as described below, whereby the cassette 1 is held firmly in position in the camera 100. The rear of the frame 11, that is inner side thereof with respect to the cassette 1, forms a rectangular well 13. The rear end of the well 13 lies parallel with the plane of the rear surface of the main body 11a, and the front end thereof is formed by the front portion 11b. The well 13 has substantially the dimensions of a film-sheet FS, whereby a film-sheet FS may fit exactly thereinto. In an approximately central portion of the well 13 there is formed a rectangular opening 12. The opening 12 extends completely through the frame 11, and the dimensions thereof correspond to those of the exposure surface FS2 of a film-sheet FS. When a film-sheet FS lies in the well 13, the exposure surface FS2 thereof is exactly framed by the sides of the opening 12. On the right-hand side of the well 13 there is formed a film-sheet extraction slit 16. In other words, the extraction slit 16 is formed at the right-hand side of the front portion 11b, the rear side of the slit 16 lying on the plane of the front surface of the main body 11a of the frame 11. The dimensions of the slit 16 are approximately the same as the cross-sectional dimensions of a film-sheet FS, whereby, after exposure, a film-sheet FS may be slid out therethrough, from the well 13 to the outside. Near the upper right-hand corner of the front portion 11b, there is formed a groove 14, which lies parallel to the top side of the front portion 11b extends to the right-hand side thereof, and also extends into the well 13. The purpose of the groove 14 is to permit removal of a film-sheet FS from the well 13 by means of a pawl 103 provided in the camera 100, as described below.

The pawl 103 is integrally formed with a lever 103a, and slidably inserts into and passes through the groove 14 of the frame 11 to extend from the well 13 to the outside of the frame 11. The pawl 103 has a straight right-hand edge, which is generally parallel to the side of the camera 100, and a sloping left-hand edge. When a film-sheet FS is at the exposure position, the pawl 103 fits into a upper engagement hole FS 5 of the film-sheet FS. When, after exposure of the film-sheet FS, the camera shutter is returned to its normal, non-operative position, the lever 103a is rotated and the lever outer end is moved rightwards, the straight edge of the pawl 103 presses against the right-hand end of the film-sheet engagement holes FS5, and draws the film-sheet FS rightwards. The film-sheet FS is drawn rightwards in this manner until the leading edge thereof contacts, and is engaged by, rolls 104, as described below. At this point, the lever 103a returns to its original position, and the lever outer end travels leftwards back to its original position. At the same time, the film-sheet FS continues to be drawn rightwards, by the action of the rolls 104. When the lever outer end travels leftward, the left-hand sloping surface of the pawl permits the pawl to slide out of the film-sheet engagement hold FS5, ride on the upper portion of the film-sheet FS, and then slide into the engagement hole of the next film-sheet FS, which, meantime, has been pushed forward to the exposure position. When this next film-sheet FS is exposed, the above described operation is repeated, and so also for succeeding film-sheets FS.

Figure 3:
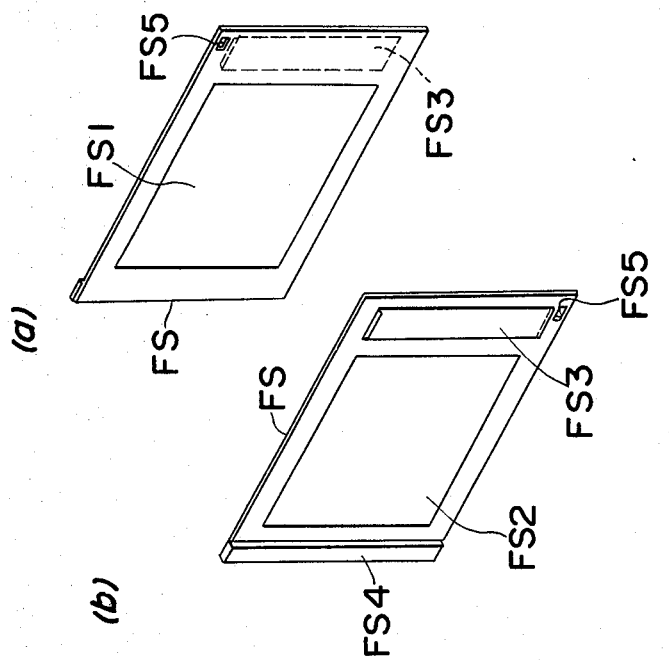

As shown in FIG. 3, film-sheets FS employed in this, and other embodiments of the invention comprise a conventional monosheet structure as used to obtain photographs by a diffusion transfer method. That is, each film-sheet FS is an integral unit comprising a rear, positive image surface FS1, a front, exposure surface FS2, on which a negative image may be formed, a built-in container FS3, which hold a conventional film processing and developing solution, and is provided in the right-hand portion of the film-sheet FS, and a trap FS4 provided along the left-hand edge of the film-sheet FS, for removal of excess processing and developing solution from the camera 100. After exposure, the film-sheet FS is moved rightwards, and the right-hand edge thereof is therefore the leading edge thereof. The film-sheet FS also comprises the small hole FS5, which is formed, respectively, in the upper right-hand corner portion of the front of the film-sheet FS. The hole FS5 is engaged by the removal pawl 103 in the camera 100, whereby, after exposure, the film-sheet FS is moved rightwards through the slit 16 to the location of a pair of processing rolls 104 in the camera 100. The cassette 1 also comprises holding bands 17, whose purpose is to retain and guide film-sheets FS in the cassette 1. The holding bands 17 are thin bands of a flexible material, and may be any suitable plastic or rubber. At least two, and preferably more, holding bands 17 are provided. The front ends 17a of the bands 17 are fixedly attached to points on the rear side of the frame main body 11a, and the other ends 17b thereof are attached to the rear side of the abovementioned backboard 19.

Referring now to FIG. 2b, the backboard 19 may be seen to be a generally rectangular board having dimensions slightly greater than those of a film-sheet FS. The backboard 19 is generally thicker than several film-sheets FS, and is made of any suitable thermosetting plastic. In this embodiment and in second, and fourth embodiments of the invention described below the backboard 19 also acts as a pressure plate as described in further detail below. The front surface of the backboard 19 is flat, and contacts and presses evenly against the rear surface of a rearmost film-sheet FS in the cassette 1. In the rear surface of the backboard 19 there are formed grooves 19a, which are for accommodation of rearward portions 17b of the holding bands 17, and which are parallel to the top and bottom, or to the sides of the backboard 19. Grooves 19a parallel to the sides of the backboard 19 are continued in the top or bottom of the backboard 19, and accommodate holding bands 17 whose front ends 17a are fixedly attached to the top or bottom of the frame 11. Similarly, grooves 19a parallel to the top and bottom of the backboard 19 are continued in the left or right side of the backboard 19, and accommodate holding bands 17 whose front ends 17a are fixedly attached to the left or right side of the frame 11. In each groove 19a there is provided and elastic element 20, one end 20a of which is fixedly attached to the backboard 19, and the other end 20b of which is fixedly attached to the rear end 17b of a holding band 17. Each elastic element 20 exerts a continuous force to pull the corresponding band end 17b inwards with respect to the cassette 1; that is, each elastic element 20 pulls the corresponding band 17 attached thereto rearwards, and thus exerts a force whereby the backboard 19 and frame 11 are drawn together as close as possible. When the cassette 1 is inserted into a camera 100, the front frame 11 is fixedly attached to the camera 100, in a manner described below. If the camera 100 is considered to be stationary, the bands 17 and elastic elements 20 may therefore be considered to act to draw the backboard 19 forwards, towards the front frame 11. In the rear surface of the backboard 19 there are also formed screw-holes 21 which are for the purpose of attachement of the above-mentioned bellows-type cover 22 to the backboard 19, as described below.

Film-sheets FS in the cassette 1 are held between the backboard 19 and the frame 11 by the bands 17. As well as being supported by the bands 17, the film-sheets FS are also kept in flat contact with one another, and are held firmly between the backboard 19 and front frame 11, since the bands 17 are attached to elastic elements 20, and draw the backboard 19 and frame 11 as closely together as the intervening film-sheets FS permit. The backboard 19 presses evenly against the rear surface of the rearmost film-sheet FS in the cassette 1. The foremost sheet lies in the well 13 of the frame 11. In this configuration, the exposure surface FS2 of the foremost film-sheet FS faces forwards, and the exposure surface FS2 of the foremost film-sheet FS is exactly framed by the frame central opening 12, as described above. Also, the engagement hole FS5 of the foremost film-sheet FS lies opposite the above-mentioned groove 14 near the top right-hand corner of the frame front 13. When the cassette 1 is mounted in a camera 100, the abovementioned removal pawl 103 may pass into and through the groove 14 to engage the hole FS5 of the foremost film-sheet FS. The pawl 103 may therefore be slid rightwards along the groove 14, and draw the foremost film-sheet FS out of the well 13, through the slit 16, and between a pair of processing rolls 104, for processing, and subsequent removal from the camera 100. When this foremost film-sheet FS has been thus removed, the elastic elements 20 and bands 17 act to move the backboard 19 a distance equal to the thickness of one film-sheet FS towards the front frame 11, whereby the next film-sheet FS in the cassette 1 is moved forwards into the well 13. After exposure and removal of this next film-sheet FS, the film-sheets FS in the cassette 1 are again moved forwards, another film-sheet FS becomes the foremost film-sheet FS, is exposed and removed, and so on, successive film-sheets FS being pushed firmly and accurately into the foremost position, wherein they may be exposed, and subsequently removed.

Referring now to FIG. 2 (c), the bellows-type cover 22 may be seen to form a main body 22a, which is expandable or retractable, and extends forwards from a back plate 23, which is formed integrally therewith. The main body 22a and back plate 23 are made of light-proof plastic or paper, or any other suitable material. The back plate 23 has generally the same dimensions as the backboard 19, and screw-holes 24 in correspondence to the abovementioned screw-holes 21 are formed therein. The cover back plate 23 fits onto the backboard 19, and is held in secure attachment thereto by screws 25, which are screwed through the screw-holes 24 of the back plate 23, and into the screw-holes 21 of the backboard 19. The front end of the main body 22a is fixedly attached to the rear rim 11d of the frame 11, thus forming an assembled cassette 1. In this configuration, the cover 22 completely covers the backboard 19 and holding bands 17. In other words, the only open portions of the cassette 1 are the opening 12 in the front frame 11, groove 14, and extraction slit 16 at the side thereof. Prior to insertion of the cassette 1 into the camera 100, film-sheets FS held in the cassette 1 are protected from entry of light through these open portions 12 by a light-proof sheet ISI (described below). After insertion of the cassette 12 into the camera 100, when successive film-sheets FS are exposed and removed, and the backboard 19 is moved towards the front frame 11, the back plate 23 being fixedly attached to the backboard 19, and the front end of the cover body 22a being fixedly attached to the frame 11, the cover 22 gradually folds, and contracts. It is not of course essential for the cover 22 to have a bellows-type construction, but the cover 22 may be simply made of a pliable material. However, a bellows-type construction is preferably, to eliminate the possibility of the cover 22 folding inwards too far, and coming between, and hindering, film-sheets FS in the cassette 1.

Referring now to FIG. 8, the abovementioned light-proof protective sheet IS1 may be seen to comprise a rectangular main portion IS1', and a small rectangular strip IS4 fixedly attached to right-hand side of the main sheet portion IS1', and generally at right-angles thereto. The main portion IS1' is thin and pliable. The strip IS4 attached thereto is slightly stiffer, although not rigid, and may be made of paper or any other suitable material. Near the top right-hand corner of the main portion IS1', a hole IS3 is formed. The hole IS3 is covered by small light-proof cover IS2, which is made of stiff paper and is fixedly bonded to the main sheet portion IS1'. As described earlier, the sheet IS1 is for the purpose of protecting film-sheets FS from exposure to light through the opening 12 in the front frame 11 during non-use thereof. Prior to insertion of the cassette 1 containing film-sheets FS into the camera 100, the protective sheet IS1 passes through the slit 16, covers the front of the foremost film-sheet FS in the cassette 1, and the left-hand edge is firmly, but not fixedly, bonded to the left-hand edge of the well 13. In this configuration, the main sheet portion IS1' completely covers the front of the foremost film-sheet FS and prevents entry of light through the opening 12, the hole IS3 lies opposite the groove 14 and film-sheet engagement holes FS5, entry of light through the groove 14 therefore being prevented by the cover IS2, and the strip IS4 is drawn up against the outside of the slit 16, thus preventing entry of light therethrough. In other words, the film-sheets FS in the cassette 1 are completely protected from exposure to light.

As shown in FIGS. 4, 6, the camera 100 comprises a conventional front body portion 100a, a conventional lens L for the direction of external images into the camera 100, and a rear portion 101. The back of the camera rear portion 101 is open, and forms the abovementioned positioning frame 101a. The positioning frame 101A forms an inset, inwardly stepped portion in the rear of the camera 100, and has a shape and dimensions such that the front frame 11 of the cassette 1 fits exactly thereinto. That is, when the cassette 1 is inserted in the camera 100, the front surface of the frame front rim 11c ies flat against the rear surface of the inner most, c. forwardmost, stepped portion of the holding frame 101a, the front surface of the frame main body 11a lies flat against the rear surface of the next stepped portion 101b, and the front surface of the rear rim 11d fits flat against the rear surface of the outermost, or rearmost, stepped portion 101c. The forward most stepped portion 101a of the frame 101a constitutes an exposure portion frame 102, in which there is formed an opening 102a having the same dimensions as the exposure surface FS2 of a flim-sheet FS. The exposure surface FS2 of a foremost film-sheet FS in the cassette 1 inserted in the camera 100 is aligned with and immediately behind this opening 102a, and external images may be focused thereon by the lens L. The front right-hand portion 101c' of the intermediate stepped portion of the holding frame 101a is cut away to permit removal of an exposed film-sheet FS, through the slit 16, by the pawl 103, as described above. Film-sheets FS are brought by the pawl 103 to the abovementioned processing rolls 104, which are aligned with the slit 16, and located near the right-hand side of the camera rear portion 101c. An extraction slit 105, which is in alignment with the rolls 104, is formed in the right-hand side of the camera rear portion 101c.

Figure 5:
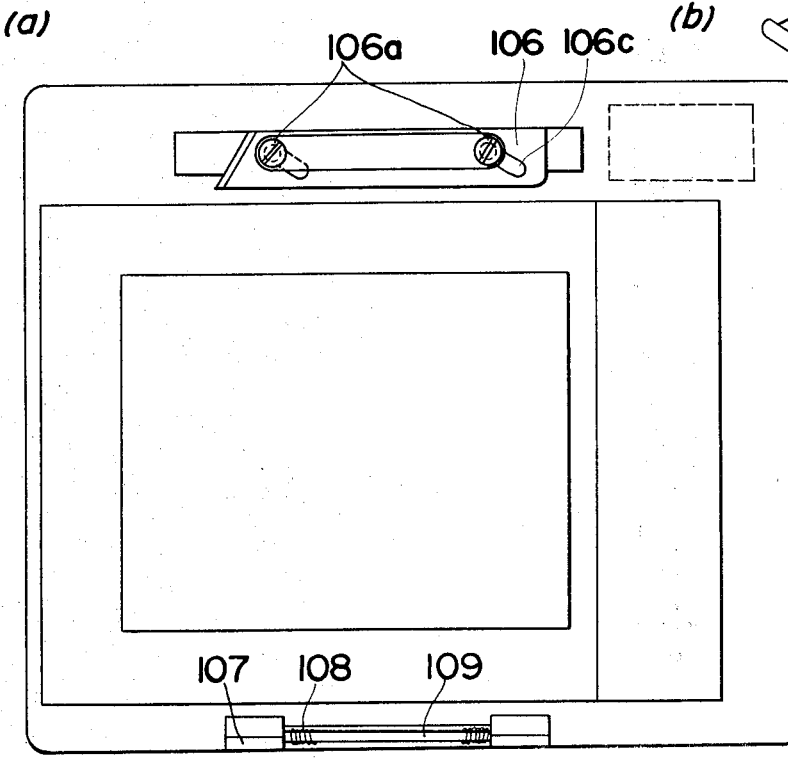
Figure 5:
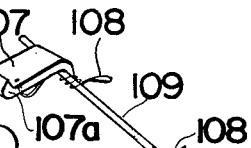
Figure 5:
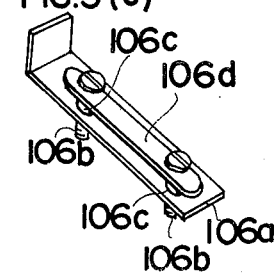

Referring now to FIGS. 5, 6, the abovementioned clamps 106 and clips 107 may be seen to be provided at the top and bottom, respectively, of the camera rear portion 101c. The clamps 106 comprise bolts 106b attached to the back of the rear portion 101c, and hold a board 106a slightly removed from the rear portion 101c with a washer 106d, and generally parallel to the back of the camera 100. When the clamps 106 are tightened, the board 106a extends slightly along slanting slits 106c thereof into which the bolts are inserted. The rear rim 11d at the top of the frame 11 may be inserted between the board 106a and the back of the camera rear portion 101c, whereby the front frame 11, and cassette 1 may be held mounted on the camera 100 by means of the clamps 106. The clips 107 are rotatably mounted on a shaft 109, which is mounted in a left to right alignment on the bottom of the camera rear portion 101c. The clips 107 are spring-loaded by wire springs 108, each of which has one end fixedly attached to the shaft 109 and the other end contacting the corresponding clip 107. The wire springs 108 exert a constant force tending to turn the clips 107 inwards with respect to the camera 100, whereby the clips 107 are normally held flat against the bottom of the camera rear portion 101, and the rearward ends 107a thereof extend rearwards, slightly beyond the back of the camera 100. The rearward end 107a of each clip 107 forms a hook, the curved part of which faces rearwards, and the tip end of which is forwardly inclined towards the interior of the camera 100. When the cassette 1 is mounted onto the camera 100, the rear rim 11d of the front frame 11 pushes against the curved parts of the clip hooked ends 107a, and cause the clips 107 to rotate on the shaft against the force of the wire spring 108, and move outwards, whereby the rear rim 11d is permitted to move past the clip ends 107a. When the rear rim 11d has moved past the clip ends 107a, the force of the wire springs 108 is no longer opposed, and the clips 107 are again moved flat against the bottom of the camera rear portion 101, and the top ends thereof prevent the rear rim 11d moving rearwards. The front frame 11 is therefore fixed by the clamps 106 and clips 107, and the cassette 1 is held firmly mounted on the camera 100. To remove the cassette 1, the clamps 106 are loosened, to permit the rear rim 11d to move outwards, whereupon the frame 11 may be rearwards and the cassette 1 with drawn.

As shown in FIG. 7, when the cassette 1 is first mounted onto the camera 100, the supplementary protective sheet IS1 covering the foremost film-sheet FS, frame grooves 14, and slit 16 is removed by actuation of the removal pawl 103. During this removal of the film-sheet IS1 a cap, or other conventional cover, is kept on the lens L, to prevent light entering the camera 100. Upon being actuated, the pawl 103 enters the grooves 14, pierces the light-proof cover IS2, and enters and engages the hole IS3. When, next, the pawl 103 begins to move rightwards, the rightwards pressure thereof against the cover IS2 causes the sheet IS1 to be pulled rightwards, and the bond of the left-hand edge of the protective sheet IS1 to the left-hand edge of the well 13 is broken, whereby the sheet IS1 may be freely removed. The pawl 103 brings the right-hand end of the sheet IS1, and strip IS4, to the location of the rolls 104, which withdraws the sheet IS1 completely from the front of the film-sheets FS in the cassette 1, and guides the sheet IS1 through the extraction slit 105, and out of the camera 100.

In other words film-sheets FS are completely protected in the cassette 1 prior to use, the cassette 1 is rapidly and simply mounted onto the camera 100, the protective sheet IS1 is removed, whereafter successive film-sheets FS may be exposed. The film-sheets FS in the cassette 1 are moved forward after exposure of each successive film-sheet FS, and successive exposed film-sheets FS are removed by the pawl 103 through the slit 16 to the rolls 104, and then carried rightwards by the rolls 104, while being processed thereby, and finally removed from the camera 100 through the slit 105.

It is evident that the number of film-sheets FS that may be contained in cassette 1, that is, the number of film-sheets FS with which the camera 100 may be loaded, is in no way dependent on the structure or size of the camera 100. In other words, the cassette 1 may contain any required number of film-sheets FS, and the camera 100 may be loaded with any number of film-sheets FS at one time.

The description will proceed below in reference to other embodiments of the present invention. Unless otherwise stated, elements of these further embodiments, and functioning thereof shall be understood to be the same as in the first abovedescribed embodiment.

In a second embodiment of the invention, which is shown in FIGS. 9, 10, wind-up shafts 34 are employed instead of elastic elements 20, to draw the backboaard 19 towards the front frame 11. As shown in FIGS. 9b and 10, the shafts 34 are mounted in cut-out portions 19b formed in the rear of the backboard 19, and at the edges thereof. Each shaft 34 is freely rotatable in a disk 33, and is in line with a side, or with the top, or bottom of the backboard 19. The rear end 17b of one band 17 is fixedly attached to each shaft 34, whereby the band 17 may be wound around one half 34a of a corresponding shaft 34. A spindle-type wind-up spring 32 is wound around the other half 34b of each shaft 34. One end of each wind-up spring 32 is fixedly attached to the backboard 19, and the other end thereof is attached to the corresponding shaft 34. The wind-up springs 32 exert a continuous force tending to cause the shafts 34 to turn and wind-up the bands 17 attached thereto. When the cassette tape 1 is full, the bands 17 are unwound from the shafts 34 against the force of the springs 32, due to the presence of film-sheets FS between the backboard 19 and the front frame 11. As each successive foremost film-sheet FS is exposed and removed, in the same manner as described above with respect to the first embodiment, the springs 32 cause the shafts 34 to rotate a little and the bands 17 to be wound a corresponding amount onto the shafts 34, whereby the backboard 19 is brought closer to the front frame 11, and a succeeding film-sheet FS is brought to the foremost position in the cassette 1. For convenience of construction, when two or more bands 17 are provided on any one side of the cassette 1, it is not essential to provide a separate shaft 34 for each band 17 on that side, but the bands 17 may be mounted on a single shaft 34 passing through adjacent cut-out portions 19b, which are separated by a partition, or partitions, 19c from the other cut-out portions 19b.

In a third embodiment of the invention, which is shown in FIG. 11, each combination of a holding band 17 and an elastic element 20 is replaced by a single rubber band 41. In this third embodiment of the invention, a backboard 19 is not required. Each rubber band 41 passes around and contacts the back of the rearmost film-sheet FS and the edges of the film-sheets FS in the cassette 1. Opposite ends of each band 41 are fixedly attached to opposite sides of the rear of the frame 11. The rubber bands 41 exert a continuous force urging the film-sheets FS towards the front frame 11, whereby remaining film-sheets FS are steadily moved forwards after exposure of and removal of successive foremost film-sheets FS. In this third embodiment, the light-proof cover 22 is replaced by a bellows-type light-proof cover 40. The cover 40 does not have a back plate; rather, it is an integral unit which covers the film-sheets FS and rubber bands 41, the front edge of the cover 40 being fixedly attached to the front frame 11. Since the cover 40 is not otherwise attached, the cover 40 should preferably have characteristics such that it automatically contracts, whereby the rear thereof steadily moves forwards as successive film-sheets FS are exposed and removed from the cassette 1.

In a fourth embodiment of the invention, which is shown in FIGS. 12 and 13, bands 17, elastic elements 20, and backboard 19 are omitted, and film-sheets FS in the cassette 1 are urged forwards by force transmitted from rubber bands 50. The rubber bands 50 are provided externally to the light-proof cover 22. The rear ends of the bands 50 are fixedly attached to the outside of the cover back plate 23 by pins 25'. One rubber band 50 passes along the top of the cover 22, and the front end thereof is fixedly attached to the top edge of the frame 11. Another rubber band 50 passes along the bottom of the cover 22, and the front end thereof is fixedly attached to the bottom edge of the frame 11. Other rubber bands 50 may, of course, be similarly provided, if required. The rubber bands 50 exert a continuous force urging the cover back plate 23 forwards, and the cover 22 to fold and contract. The inside of the cover back plate 23 contacts the back of the rearmost film-sheet FS in the cassette 1, either directly, or through a pressure plate, or backboard (not shown in the drawings). The forwards pressure on the back plate 23 is therefore transmitted to the film-sheets FS in the cassette 1, and the film-sheets FS are steadily moved forwards as successive foremost film-sheets FS are exposed and removed.

FIGS. 14, 15 and 16 show a fifth embodiment of the invention, according to which the means for urging film-sheets FS forwards is provided, not directly in the cassette 1 itself, but on the camera 100 to which the cassette 1 is mounted.

Referring now more particularly to FIG. 14, the front frame 11 and cover 22 may be seen to be the same as employed in the first embodiment. The backboard 19, however, has a modified design, as shown in FIG. 14b. The backboard 19 according to this embodiment comprises a rim 60, provided around the backboard 19, and projecting slightly rearwards with respect thereto; that is, the rear surface of the backboard 19 lies further forward than the rear edge of the rim 60. The front surface of the backboard 19 contacts the rear surface of the rearmost film-sheet FS in the cassette 1. The rear ends of the bands 17 are attached to hook-like elements 61, which may not move forwards past the rim 60. The front ends of the bands 17 are fixedly attached to points on the rear side of the frame main body 11a, as shown in FIG. 14 (a). In this embodiment, elastic elements 20 are omitted, and film-sheets FS in the cassette 1 are urged forwards by a pressure plate 117 provided at the rear of the camera 100, as shown in FIGS. 15 and 16. As successive film-sheets FS are exposed and removed from the cassette 1, and the combined thickness of the remaining film-sheets FS in the cassette 1 becomes less, the pressure plate 117 pushes the cover 22 against the backboard 19. As the backboard 19 moves forward, the ends of the bands 17 attached to the hook-like elements 61 are drawn around the rim 60 and inwards with respect to the cassette 1, i.e., in the direction of the arrows i in FIG. 14 (b), and the portions of the bands 17 outside the rim 60 are correspondingly shortened. However, the bands 17 may be lengthened only to a certain degree upon original insertion of film-sheets FS in the cassette 1, since the hook-like elements are stopped at the rim 60. In other words, the cassette 1 may contain only a certain number of film-sheets FS and there may be no more than a certain front to rear extension of the cassette 1. This front to rear extension of the cassette 1 is set because, in mounting the cassette 1 on a camera 100, the cassette 1 must first be inserted between the rear of the camera 100 and a pressure plate 117, which may not move more than a certain distance from the rear of the camera 100, as described below. Extending upwards and downwards from the rear edges of the lower and upper sides, respectively, of the rim 60 there are provided attachment plates 62, which are fixedly attached to, or integrally formed with, the rim 60. The back plate 23 of the cover 22 is attached to the rim 60 and backboard 19 assembly by screws 25, which are screwed through the abovementioned screw-holes 24, and into corresponding screw-holes formed in the attachment plates 62. The front edge of the cover 22 is fixedly attached to the front frame 11, as in the first embodiment.

As shown in FIGS. 15 and 16, the camera 100, which is used in association with the fifth embodiment of the invention, is provided with spring-loaded lever assemblies 110, 112. The lever assemblies 110, 112 form pairs at the left and right-hand sides of the camera 100, there being one pair at the top and one pair at the bottom of the camera 100. The description will proceed below in reference to the top pair of lever assemblies 110, 112, it being understood that construction of both pairs is the same.

Each pair of lever assemblies 110, 112 comprises two horizontal levers 110a, 110b and 112a, 112b, respectively. The levers 110a, 110b are both rotatably mounted at one end on a pin 114. The levers 112a, 112b also are mounted rotatably at one end on a pin 115. The other ends of the levers 110a, 112a, which are the forward ends thereof, are rotatably mounted on separate pins 111. The pins 111 are fixedly attached to horizontal surfaces in portions 101d, which are cut out from the rear upper edge of the camera rear portion 101. The other ends of the levers 110b, 112b, which are the rear ends thereof, are rotatably mounted on separate pins 118, which are fixedly attached to the top of the abovementioned pressure plate 117. The pressure plate 117 is in a generally vertical alignment, and is generally parallel to the rear of the camera 100. Inwardly extending rear portions 117a are formed along the top and bottom edges of the pressure plate 117. In each extension portion 117a there is formed a groove 117b. The top and bottom edge portions of the back plate 23 of the cassette cover 22 may be slid into, and along the top and bottom grooves 117b, whereby the cassette 1 may be held in attachment to the pressure plate 117, as described in further detail below. The left-hand ends of the grooves 117b are closed by stops 117c.

The lever assemblies 110, 112 are connected by a straight lever 113. The central pin 114 of the lever assembly 110 is in rotatable attachment to the left-hand end of the straight lever 113. The central pin 115 of the lever assembly 112 is slidably mounted in a groove 113a formed in the straight lever 113. The groove 113a is formed generally along the longitudinal axis of the straight lever 113, and extends from near the right-hand end of the straight lever 113 to approximately the center thereof. The left-hand end of the groove 113a, that is, the end thereof near the center of the straight lever 113, turns and forms a hook-shaped portion 113b, which is inclined to the right. Each lever assembly 110, 112 is spring-loaded by a wire spring 116. The wire spring 116 of the lever assembly 110 passes around the central pin 114, and the opposite ends thereof are attached to the levers 110a, 110b, respectively. Similarly, the wire spring 116 of the lever assembly 112 passes around the central pin 115, and the opposite ends thereof are attached to the levers 112a, 112b, respectively. Each wire spring 116 exerts a continuous force urging the corresponding levers 110a, 110b, or 112a, 112b, towards one another. That is, the wire springs 116 tend to close the lever assemblies 110, 112. When the lever assemblies 110, 112 are closed, the pressure plate 117 attached to the levers 110b, 112b through the pins 118, is caused to move forwards, towards the camera 100. Contrariwise, when the pressure plate 117 is moved manually, away from the rear of the camera 100, the lever assemblies 110, 112 are opened. When the lever assemblies 110, 112 are thus opened, the central pin 14 of the lever assembly 110 pushes the straight lever 113 rearwards and to the right. At the same time, the central pin 115 of the lever assembly 112 slides leftwards along the groove 113a, and also pulls the right-hand portion of the straight lever 113 rearwards slightly. When the lever assemblies 110, 112 are completely opened, that is, when the levers 110a, 112a form straight lines with the levers 110b, 112b, respectively, the pin 115 comes to the left-hand end of the groove 113, and moves into the hooked portion 113b, as shown with chain lines in FIG. 15. The pin 115 may not therefore move rightwards, the lever assemblies 110, 112 remain open, and the pressure plate 117 is held away from the rear of the camera 100. A cassette 1 containing a certain number of film-sheets FS is now inserted between the pressure plate 117 and the rear of the camera 100, the cover back plate 23 being slid along the grooves 117b as far as the stops 117c. Next, the pin 115 is disengaged manually from the groove hooked portion 113b and moved into line with the straight portion of the groove 113a. The pin 115 now being free to move rightwards, the springs 116 are unopposed, and cause the lever assemblies 110, 112 to close, and the pressure plate 117 to be moved as far forwards towards the rear of the camera 100 as the intervening film-sheets FS in the cassette 1 permit. As successive foremost film-sheets FS are exposed and removed, the wire springs 116 close the lever assemblies further, and the pressure plate 117 is moved further forwards. The pressure plate 117 pushes remaining film-sheets FS forwards, whereby successive film-sheets FS are brought to the foremost exposure position in the cassette 1.

As is clear from the above description, the present invention provides a film cassette which is compact and simple in construction, and which makes it possible to load a camera with 20–50 film-sheets at one time. The cassette of the invention thus makes it possible for a photographer to take a large number of shots in rapid succession without having to reload the camera. The invention offers another great advantage in that a camera used in association with a cassette of the invention is much lighter and more compact than conventional auto-process cameras, and, moreover, may be loaded with widely varying numbers of film-sheets without requiring any structural modification whatever. The invention thus provided great advantages to a photographer in that the number of times loading is necessary is cut, and that he or she may have lighter and more easily manipulated photographic equipment.

What is claimed is:

1. A cassette adapted to carry a plurality of film-sheets each of which has an exposure surface, said cassette comprising:
   a. a front frame having:
      i. external dimensions which adapt said front frame to be freely fitted into or removed from a camera rear portion positioning frame,
      ii. a well adapted to receive at least one film-sheet carried in the cassette,
      iii. an opening in the front thereof the dimensions of which correspond to those of the exposure surfaces of the film-sheets carried in the cassette, and
      iv. a film-sheet extraction slit in one side thereof the dimensions of which are approximately the same as the cross-sectional dimensions of the film-sheets carried in the cassette;
   b. a plurality of film-sheets at least one of which is received in said well;
   c. a bellows-type cover made of a light-proof material and surrounding said film-sheets; and
   d. flexible, elastic holding bands connecting said front frame to said bellows-type cover, said holding bands being of lengths sufficiently short to exert a continuous force to pull said film-sheets towards said front frame, whereby said bellows-type cover will gradually fold and contract as successive film-sheets are removed from the cassette.

2. A cassette as claimed in claim 1 and further comprising a backboard positioned against said film-sheets, said holding bands being attached to said backboard to exert a continuous force pulling said backboard towards said front frame and said cover being attached to said backboard.

3. A cassette as claimed in claim 2 wherein said backboard is adapted to be connected to and urged towards the rear of a camera.

* * * * *